US011242437B2

(12) United States Patent
Perotto et al.

(10) Patent No.: US 11,242,437 B2
(45) Date of Patent: Feb. 8, 2022

(54) PROCESS FOR THE PREPARATION OF BIODEGRADABLE PLASTIC FILMS

(71) Applicant: FONDAZIONE ISTITUTO ITALIANO DI TECNOLOGIA, Genoa (IT)

(72) Inventors: Giovanni Perotto, Genoa (IT); Ilker Bayer, Genoa (IT); Athanasia Athanasiou, Ceranesi (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 337 days.

(21) Appl. No.: 16/477,041

(22) PCT Filed: Jan. 10, 2018

(86) PCT No.: PCT/IB2018/050146
§ 371 (c)(1),
(2) Date: Jul. 10, 2019

(87) PCT Pub. No.: WO2018/134702
PCT Pub. Date: Jul. 26, 2018

(65) Prior Publication Data
US 2021/0284810 A1    Sep. 16, 2021

(30) Foreign Application Priority Data
Jan. 17, 2017    (IT) .................. 102017000004597

(51) Int. Cl.
*C08L 5/00*    (2006.01)
*C08J 5/18*    (2006.01)
*C08H 8/00*    (2010.01)

(52) U.S. Cl.
CPC .................. *C08J 5/18* (2013.01); *C08H 8/00* (2013.01); *C08J 2497/02* (2013.01)

(58) Field of Classification Search
CPC ... C08J 5/18; C08J 3/03; C08J 2397/00; C08J 2497/00; C08J 3/18; C08J 2301/00;
(Continued)

(56) References Cited

U.S. PATENT DOCUMENTS

2010/0297704 A1* 11/2010 Li .......................... D21C 1/04
435/72

FOREIGN PATENT DOCUMENTS

CN    1357576 A    7/2002
CN    103387685 A    11/2013
(Continued)

OTHER PUBLICATIONS

Andrade, et al., Development and Characterization of Edible Films Based on Fruit and Vegetable Residues, Jan. 14, 2016, Journal of Food Science, vol. 81, pp. E412-E418 (Year: 2016).*
(Continued)

*Primary Examiner* — Coris Fung
*Assistant Examiner* — Ritu S Shirali
(74) *Attorney, Agent, or Firm* — Lucas & Mercanti, LLP

(57) ABSTRACT

A process for the manufacture of biodegradable plastic films in aqueous environment, starting from vegetal wastes in powder form includes dissolution at a temperature lower than 50° C. of waste material in form of a powder in an aqueous solution of hydrochloric acid, and transfer of the aqueous solution in a casting mould and evaporation of the aqueous solution, to yield the biodegradable plastic film. The total concentration of the hydrochloric acid is equal to or lower than 5% by weight. The aqueous solution may include acetic acid. The aqueous solution may also be filtered or centrifuged and/or subjected to dialysis against pure water.

8 Claims, 7 Drawing Sheets

(58) Field of Classification Search
CPC ............ C08J 2397/02; C08J 2401/00; C08J 2497/02; C08J 2399/00; C08J 5/048; C08J 5/045; C08J 2201/0484; C08J 7/14; C08J 9/28; C08L 97/02; C08L 1/12; C08L 1/02; C08L 2201/06; C08L 97/00; C08L 5/14; C08L 1/00; C08L 2201/54; C08L 95/005; C08H 8/00; C08H 1/00; C08H 6/00
See application file for complete search history.

(56) References Cited

FOREIGN PATENT DOCUMENTS

| WO | 2014170546 A1 | 10/2014 |
|---|---|---|
| WO | 2015063700 A1 | 5/2015 |

OTHER PUBLICATIONS

Ferreira, et al., Formulation and characterization of functional foods based on fruit and vegetable residue flour, Feb. 2015, J Food Sci Technol., vol. 52, pp. 822-830 (Year: 2015).*

Trygg, et al., Enhancement of cellulose dissolution in water-based solvent via ethanol-hydrochloric acid pretreatment, Apr. 2011, Cellulose, vol. 18, pp. 987-994 (Year: 2011).*

Sigma-Aldrich: Hydrochloric acid [online], [retrieved on Nov. 10, 2021]. Retrieved from the internet. < URL: https://www.sigmaaldrich.com/US/en/product/sial/435570 > (Year: 2021).*

The Engineering ToolBox: Water—Density, Specific Weight and Thermal Expansion Coefficients [online], [retrieved on Nov. 10, 2021]. Retrieved from the internet. < URL: https://www.engineeringtoolbox.com/water-density-specific-weight-d_595.html > (Year: 2021).*

Science Struck: Density of Ethanol [online], [retrieved on Nov. 10, 2021]. Retrieved from the internet. < URL: https://sciencestruck.com/density-of-ethanol > (Year: 2021).*

KIMURA et al., "Versatile Molding Process for Tough Cellulose Hydrogel Materials", Scientific Reports, 2015, vol. 5, No. 1, pp. 1-8.

Gindl et al., "All-cellulose nanocomposite", POLYMER, 2005, vol. 46, No. 23, pp. 10221-10225.

International Search Report and Written Opinion for Corresponding International Application No. PCT/IB2018/050146 (13 Pages) (dated Mar. 2, 2018).

* cited by examiner

PROCESS FOR THE PREPARATION OF BIODEGRADABLE PLASTIC FILMS

CROSS-REFERENCE TO RELATED APPLICATIONS

This application is a 371 of PCT/IB2018/050146, filed Jan. 10, 2018, which claims the benefit of Italian Patent Application No. 102017000004597, filed Jan. 17, 2017.

FIELD OF THE INVENTION

The present invention refers in general to the field of biodegradable plastic materials, and more precisely it refers to a novel, improved process for the preparation of biodegradable plastic films, entirely carried out in aqueous environment and starting from vegetal wastes.

STATE OF THE ART

Further to a growing environmental awareness of the public opinion and to the economic motivations of industry to find increasingly advantageous ways to reuse waste materials in a cost-effective way, in the last decades great efforts have been made in research to find new ways to recycle waste materials.

The purpose of these studies is to contribute to a sustainable economy with new industrial processes in which, starting from a waste material, materials with a certain usefulness can be obtained as raw materials: in this way, a virtuous economic cycle is created, wherein a new useful material is obtained from a waste material. In order for the cycle to be truly virtuous, however, the new processes must also be sustainable in themselves, therefore they should not use polluting reagents, nor create polluting wastes on their turn, or even consume large quantities of energy or of raw materials.

These general principles also apply to food wastes, both domestic and industrial, which in industrialized countries have reached levels that are no longer acceptable, so that laws have already been enacted that should put a stop to wastes and encourage re-use.

Currently, dehydrated vegetal wastes, such as radicchio leaves, carrot wastes and parsley or cauliflower stalks, are disposed of by incineration, by composting, or they are used as fillers in the manufacture of animal food. Moreover, the Applicant themselves have in the past developed a process for processing such vegetal wastes into biodegradable plastic films, thus proposing a sort of valorisation of these waste products, having great potential applications.

This process disclosed in WO 2015/063700, however, involved the use of a very strong halogenated organic solvent, the trifluoroacetic acid (TFA), for dissolving the starting plant materials. The use of TFA is problematic because of its corrosive and oxidizing power, which makes it difficult to use the large volumes required to produce the material in a great amount. Just because of its strength, the materials themselves are partially oxidised and degraded. Furthermore, the proposed process of dissolution in TFA of the plant wastes is very slow, and reaches completion within a few days. In addition, TFA is a high-boiling point solvent, therefore it is more difficult to eliminate any residue from the final product, which therefore cannot be used for instance in food. Finally, more generally speaking, the use of polluting solvents requiring a particular treatment such as TFA, makes the cost of the process higher, thus also making it more difficult to scale up the process for industrial purposes.

Always starting from plant waste, processes carried out in an aqueous environment are also known, but these are processes having the purpose of obtaining pectins from vegetal wastes that are particularly rich in pectins. These are processes of extraction of pectins, in particular from apple scraps or lemon peels, and they are not processes of conversion of a vegetal waste into another product, as can be a plastic film. Therefore, in these known processes, only a part of the starting wastes, up to a maximum of 30%, can be recovered and appreciated in the extract obtained, however in the form of powder, without the possibility to obtain a complete reuse of the waste mass.

To date, as far as the Applicant is aware, a process of reuse of vegetal waste materials such as those mentioned above, which can be carried out entirely in an aqueous environment and yields valuable products, as can be a biodegradable plastic, has not yet been developed.

SUMMARY OF THE INVENTION

The present invention aims, therefore, to provide a novel process carried out entirely in an aqueous environment that allows for obtaining biodegradable plastic films, starting from vegetal wastes.

A particular subject of the present invention is to provide a process of the above said type that is environmentally sustainable and guarantees the absence of any harmful residue in the final product, for example a residue of organic solvent, so that the final product can be considered in its turn an edible product such as the starting materials are.

A still further subject of the present invention is to provide a process that is rapid in obtaining the final product and does not require reagents, solvents and/or operating conditions involving high costs and difficulties in the industrial scaling up of the process.

A still further subject of the present invention is to provide a process that does not cause any degradation or oxidation of the starting material, but preserves, on the contrary, its properties in the plastic film obtained at the end of the process.

A still further subject of the present invention is to provide a process for the preparation of a product that can be easily mixed with monomers, macromolecules, fillers, functional products or water-soluble particles, or used to create composites on substrates such as paper or fabrics, so as to expand the characteristics of the film that can be obtained also widening further its applications.

These and further subjects are achieved by the process for the preparation of biodegradable plastic films according to the invention, whose essential characteristics are defined in the claim 1 here attached.

Further important features of the process according to the present invention are defined in the dependent claims here attached.

BRIEF DESCRIPTION OF THE FIGURES

Further features and advantages of the process according to the invention will be more clearly illustrated in the following description of exemplary, non-limiting embodiments thereof with reference to the attached figures, wherein.

DETAILED DESCRIPTION OF THE INVENTION

Figure 1:
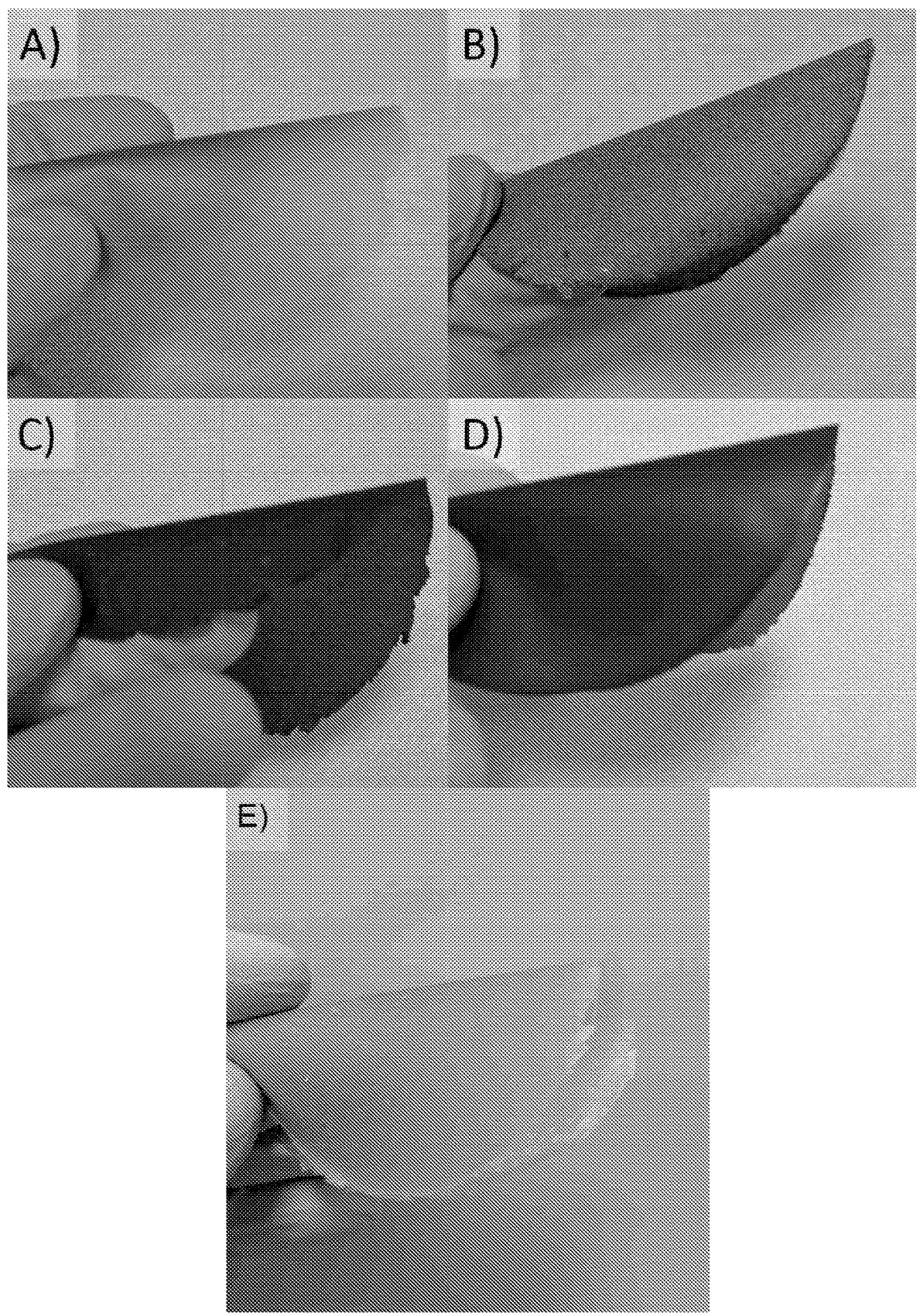
FIG. 1: in the pictures from A) to E), film samples are showed obtained respectively in the following Examples from 1 to 5.

The present invention provides a process for the manufacture of a biodegradable plastic film starting from a vegetal waste material, which consists of the following steps:

i) dissolution at a temperature lower than 50° C. of the waste material in form of a powder in an aqueous solution of hydrochloric acid, optionally added with acetic acid, wherein the total concentration of acid is equal to or lower than 5% by weight;

ii) transfer the solution obtained in step i), optionally filtered or centrifuged and/or subjected to dialysis against pure water, in a casting mould and evaporation of the aqueous solution coming from the previous step.

The dissolution in step i) can be carried out in any suitable container, preferably equipped with stirring so as to assist dissolution of the material. At temperature lower than 50° C., a complete dissolution of the pulverised waste material was observed in times significantly shorter than for the known processes, in any case shorter than 18 hours.

According to an embodiment of this process, the time required for a complete dissolution of the waste material in the aqueous solution ranges between 1 and 18 hours, and preferably it is of approximately 6 hours.

According to a particular embodiment of the process of the invention, the temperature in step i) of the present process ranges between 15 and 40° C.

According to a preferred embodiment of the process of the invention, the temperature in step i) of the present process is the room temperature.

The waste material used as starting material in the process of the present invention can for instance comprise wastes or a surplus of edible plants; non-limitative examples of these plants are carrots, radicchio, parsley and cauliflower. Further non-limitative examples of these edible plants are broccoli, tomato peel, coconut shells and spinach waste. This waste material is in powder form, typically consisting of particles having sizes comprised between 10 and 500 micrometres. A size for the powder particles outside of this range, in particular a smaller size, may anyway be used in the process. The present waste material in form of a powder can be previously dried before being dissolved in the aqueous solution, for example by a simple drying treatment following exposure to air.

In the present invention, by the expression "waste material" it is meant any vegetal material that was not previously subjected to any treatments, in particular to a purifying treatment, but instead a material that was just powdered and optionally dried at least partially. According to a preferred embodiment, this vegetal material may comprise up to approximately 62% (mol) of cellulose, up to approximately 35% (mol) of pectin, up to 15% (mol) of hemicellulose and up to 30% (mol) of other components such as polyesters or fat materials.

According to the invention, the concentrations of the starting material can be comprised for instance between 0.1 and 20% by weight with respect to the weight of the aqueous solution. The preferred concentration of the starting material for implementing the present process ranges between 4 and 10% by weight with respect to the weight of the aqueous solution. Depending on the kind of material, any person having ordinary skills in the art will be able anyway to select and modulate the concentration of the starting material also outside of the above said range, so as to achieve the dissolution thereof under the conditions of the present process and prepare a solution having a suitable viscosity for the subsequent step of casting.

The amount of hydrochloric acid, and optionally of acetic acid too, in water for the dissolution of the waste material in step i) of the invention process is overall equal to or lower than 5% by weight, but it may vary in the range between 0.01 and 10% by weight, obtaining however an acceptable dissolution degree of the starting material. According to an embodiment of the present invention, the ratio between HCl and acetic acid in the aqueous solution in step i) of the process of the invention ranges between 100:1 and 1:50, for instance is equal to 1:10.

Once the solution is obtained, it is transferred in the casting mould for the step ii) of the present process; these moulds can be moulds suitably shaped, made of glass, of ceramic material, or of non-adhesive plastic material, and inside them, by evaporation of the aqueous solution, the plastic films are obtained. The evaporation in step ii) is carried out under ambient conditions too.

In some embodiments, the solution obtained in step i) can be previously filtered or centrifuged in order to eliminate possible vegetal materials not dissolved, before being subjected to casting.

In other particularly preferred embodiments of the present process, the solution coming from step i) is subjected to dialysis against pure water before being subjected to casting in the subsequent step; this allows to eliminate all traces of the acids used in the first step of the process and to obtain a film simply by casting directly from a pure water solution. On the other hand, this operation did not compromise the characteristics of stability and mechanical resistance of the film subsequently obtained, as shown in the experimental part that follows.

The final product in the form of a so obtained film does possess elasticity, good stability and mechanical properties, as showed below in the experimental part, and it can be subsequently subjected to various kinds of processings, including colouring, decoration, waterproofing treatments, etc. or used to form composites on substrates such as paper or fabrics.

According to a particular embodiment, which allows modulating the hydrophobic characteristics, the film obtained as described above is subjected to washing by immersion of the film in water for a time more or less long depending on the degree of hydrophobicity required for the film. This washing with water, by dissolving the soluble substances present on the film, such as the sugars, increases the hydrophobicity of the film.

The process of the present invention allows therefore obtaining plastic films having a good mechanical strength, starting from vegetal waste materials that would normally be destined for composting or incineration, and this is achieved without using any organic solvent, any chemical reagent or reaction conditions that could degrade the starting material, or create damages to the environment and/or leave harmful residues in the final product. In particular, the present process has proved to be capable of maintaining unaltered the anti-oxidant properties of the starting material.

Furthermore, the process of the invention does not require a large consumption of energy or expensive reagents, and it can be easily scaled up in industry, thus representing an ideal route for waste materials to be recycled.

Finally, as mentioned above, to the solution to be subjected to casting products of different types may be added, such as monomers, macromolecules, fillers, functional products or water-soluble particles, they do not compromise the formation of the final plastic film, but on the contrary their characteristics are expanded so that their applications are further widened.

The following experimental examples are herein reported for non-limitative, illustrative purposes of the present invention.

Example 1

Carrot pomace, dried and reduced to powder form, was dispersed in a 5% aqueous solution of HCl in amount equal to 40 mg of pomace per ml of solution. This dispersion was maintained at room temperature for 18 hours, thus obtaining a solution that was then subjected to casting and a film showed in FIG. 1A) was obtained.

The so obtained bioplastic film of carrot pomace was characterized by analysis of its composition, which resulted composed by cellulose for 61% (mol), by pectin for 28% (mol), by hemicellulose for 8% (mol) and by aliphatic polyesters (C16) for 3% (mol).

Example 2

The same preparation under the same operative conditions of time and temperature indicated above in Example 1, and with the same concentration of starting material in the 5% aqueous solution of HCl, was repeated with parsley wastes, previously dried and reduced into powder form. The film obtained by casting from the solution is showed in FIG. 1 B).

The so obtained bioplastic film of parsley wastes was characterized by analysis of the composition, which resulted 48% (mol) cellulose, 31% (mol) pectin, 15% (mol) hemicellulose and 6% (mol) aliphatic polyesters (C16).

Example 3

The same preparation under the same operative conditions of times and temperatures indicated above in the Example 1, and with the same concentration of starting material in the 5% aqueous solution of HCl, was repeated with radicchio wastes, previously dried and reduced into powder form. The film obtained by casting from the solution is showed in FIG. 1 C).

The so obtained bioplastic film of radicchio wastes was characterized by analysis of the composition, which resulted 44% (mol) cellulose, 34% (mol) pectin, 4% (mol) hemicellulose and 18% (mol) aliphatic polyesters (C16).

Example 4

The same preparation under the same operative conditions of times and temperatures indicated above in the Example 1, and with the same concentration of starting material in the 5% aqueous solution of HCl, was repeated with cauliflower pomace, previously dried and reduced into powder form. The film obtained by casting from the solution is showed in FIG. 1 D).

Similarly, films were prepared by casting of solutions starting from pomace wastes of broccoli, spinach, tomato peel and coconut shells.

The so obtained bioplastic film of cauliflower wastes was characterized by analysis of the composition, which was 46% (mol) cellulose, 24% (mol) pectin, 9% (mol) hemicellulose and 21% (mol) aliphatic polyesters (C16).

Example 5

The same preparation, under the same operative conditions of times and temperatures of Example 1, and with the same concentration of starting material, was repeated starting from dried carrot pomace in powder form, dispersed in a 5% aqueous solution of HCl and acetic acid, in a HCl: acetic acid ratio of 1:10, and left for 18 hours at room temperature before casting. The film obtained by casting from the solution is showed in FIG. 1 E).

Example 6

The same preparation of Example 1 was repeated with the same concentration of carrot waste, previously dried and reduced into powder form, dispersed in the 5% aqueous solution of HCl, but preparing the film by casting of the solution after 6 hours at room temperature.

Example 7

The same preparation under the same operative conditions of times and temperatures indicated above in Example 1, and with the same concentration of carrot pomace previously dried and reduce in powder form in the 5% aqueous solution of HCl, was repeated by subjecting the solution to dialysis before casting.

Example 8

The film of Example 1 obtained by carrot waste was subjected to a treatment of washing with water by immersion of the film in water for about 20 minutes. This washing treatment, besides removing any acidic residue, also causes the dissolvement of all hygroscopic components contained in the film, such as sugars, salts, etc., making the film itself more hydrophobic, as showed in the following.

Example 9

The film of Example 2 obtained from parsley waste was subjected to a treatment by washing with water by immersion of the film in water for about 20 minutes.

Example 10

The film of Example 3 obtained from radicchio waste was subjected to a treatment by washing with water by immersion of the film in water for about 20 minutes.

Example 11

The film of Example 4 obtained from cauliflower waste was subjected to a treatment by washing with water by immersion of the film in water for about 20 minutes.

Example 12—Study of the Mechanical Properties of the Films

The films obtained as described above in the Examples 1-4 have been subjected to tensile tests in order to evaluate their mechanical properties. The mechanical properties have been characterised by cutting specimens according to ISO UNI EN Standard 527-2 5A from the films of the various materials, and by measuring the stress-strain curves according to ISO UNI EN Standard 527-3 with a dual column testing instrument INSTRON 3365.

Figure 2:
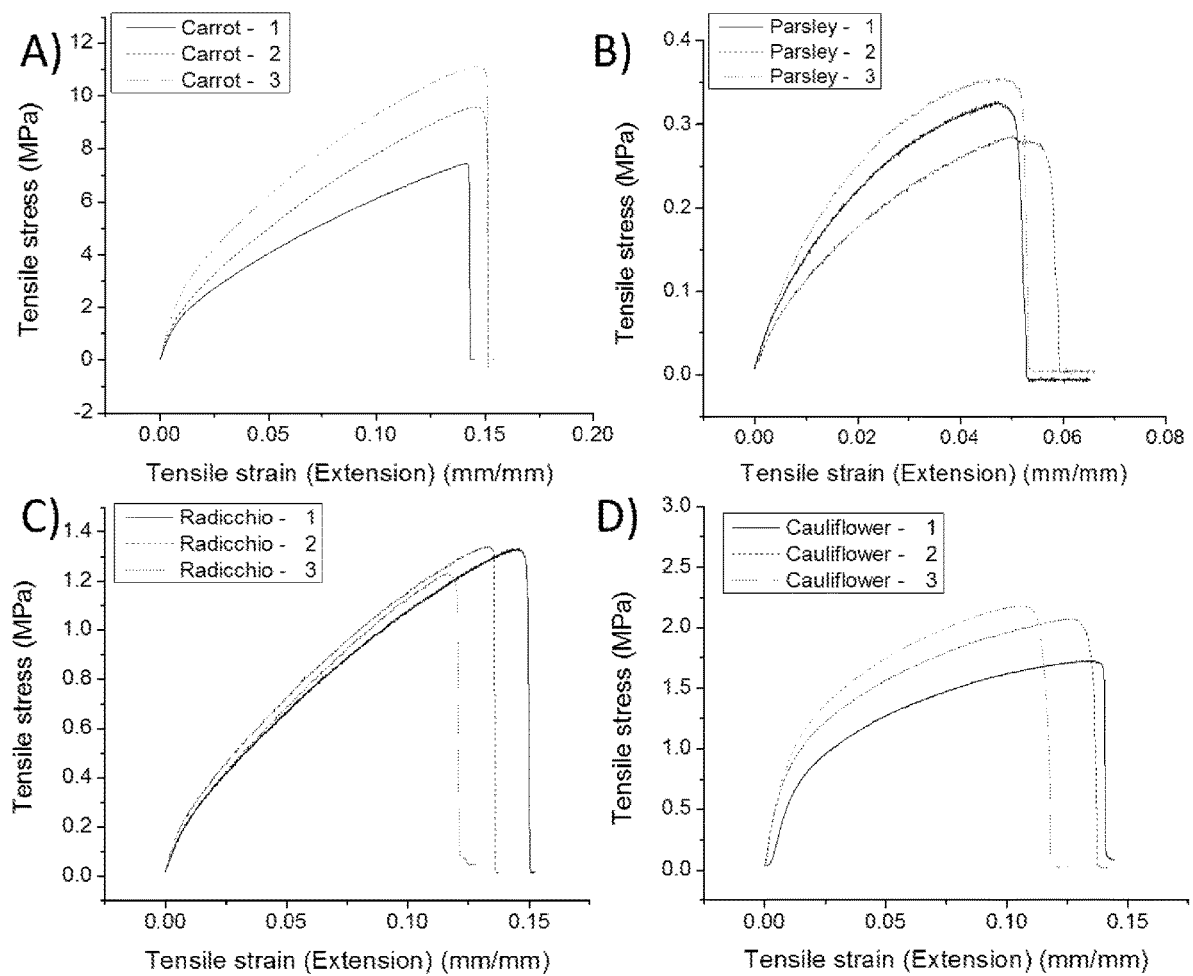
FIG. 2: in the figures from A) to D) are illustrated diagrams of tensile stress/tensile strain by extension obtained for the films prepared according to the following Examples 1-4.

In the FIGS. 2 A), 2 B), 2 C) and 2 D), the stress/strain diagrams obtained for the tested films are illustrated: for each of the four different vegetal starting materials. FIG. 2 shows a diagram with three samples 1-3 that are three replications of the same material to also show the statistical variability in the properties of the material. The measured values for the Young's modulus, the tensile strain (extension) and the tensile stress are summarised in the Table 1 below for the different films prepared starting from different waste materials.

TABLE 1

| Sample | Young's modulus (MPa) | Tensile strain at maximum load (mm/mm) | Tensile stress at maximum load (MPa) |
|---|---|---|---|
| Ex. 1 | 220 ± 50 | 0.15 ± 0.01 | 9.5 ± 1.5 |
| Ex. 2 | 17 ± 2 | 0.048 ± 0.002 | 0.33 ± 0.03 |
| Ex. 3 | 22.2 ± 1.5 | 0.13 ± 0.01 | 1.30 ± 0.05 |
| Ex. 4 | 100 ± 30 | 0.12 ± 0.01 | 2.0 ± 0.2 |

For the films obtained from carrot pomace and cauliflower pomace, particularly surprising results have been observed in terms of tensile strength, comparable to those of commercial plastic films manufactured with polymers such as LDPE (Low Density PolyEthylene).

Figure 3:
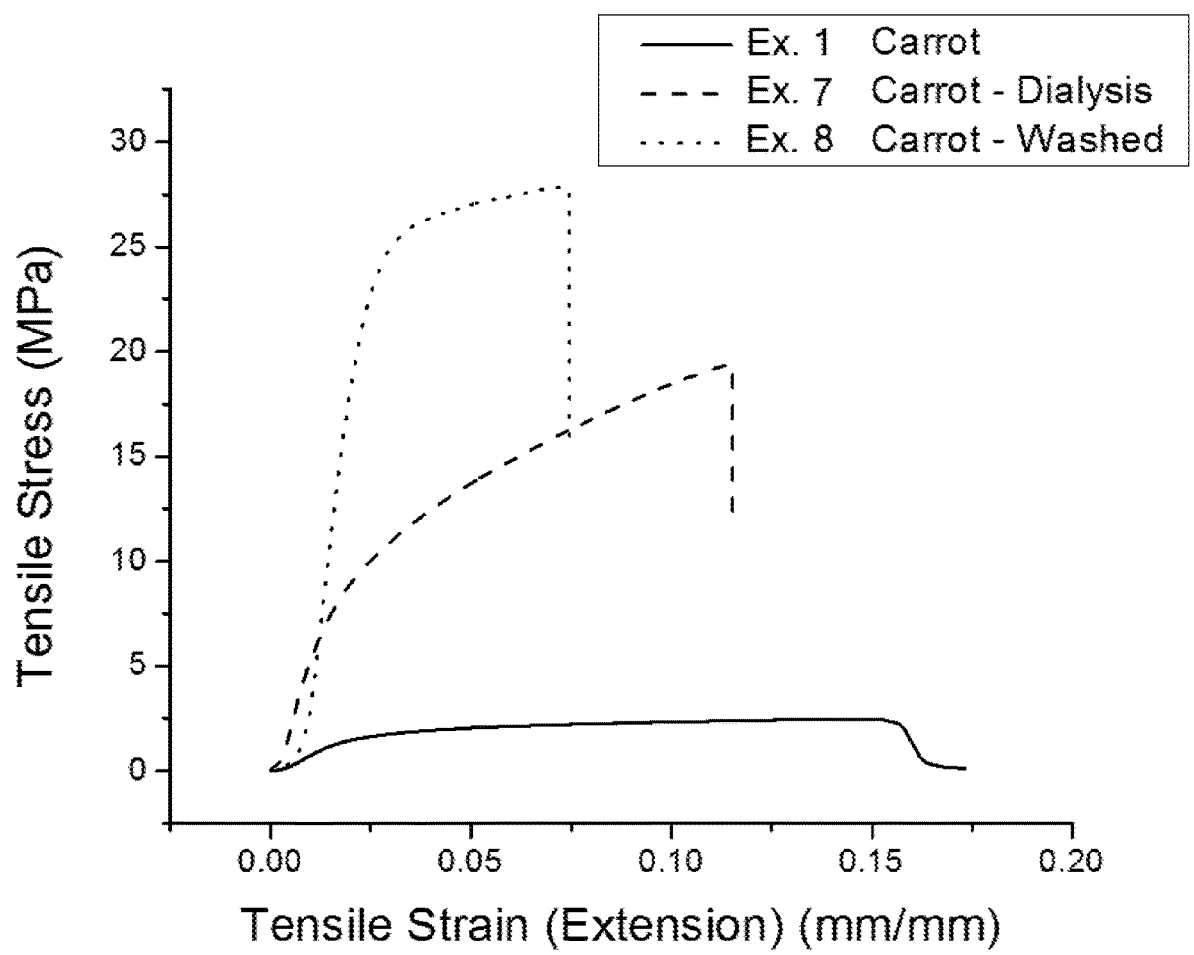
FIG. 3: shows the diagrams stress/strain by extension obtained for the films prepared according to the following Examples 1, 7 and 8.

Further tests of mechanical tensile strength have been carried out on the films obtained from carrot pomace, in order to evaluate the possibility of modulating, during the film preparation, the mechanical properties of the film obtainable, making it more or less rigid or plastic. In particular, the tensile tests described above were repeated in parallel, as well as on the film of carrot pomace obtained as described in the Example 1, and on the films prepared according to the procedures of the Examples 7 and 8. The results are illustrated in the graph of FIG. 3.

Figure 4:
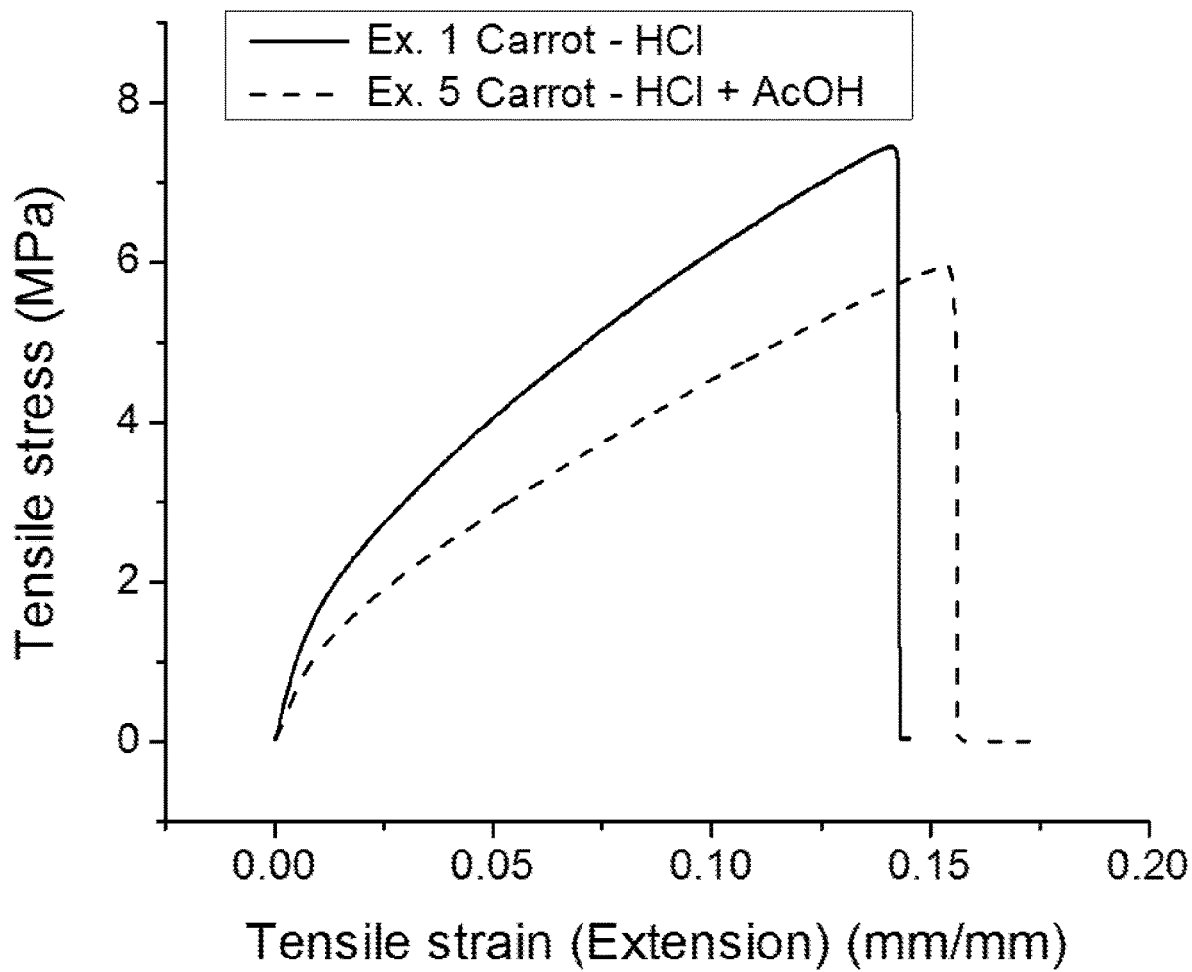
FIG. 4: shows the diagrams stress/strain by extension obtained for the films prepared according to the following Examples 1 and 5.

Further tensile strength tests were carried out according to the procedures described above also on the film obtained as in the Example 5 and in parallel on the film obtained in the Example 1, finding that the two films—that obtained with the aqueous solution of hydrochloric acid and that obtained with an aqueous solution wherein part of the hydrochloric acid is replaced by acetic acid—have an analogous behaviour. The results of the tests are showed in FIG. 4.

Example 13—Study of the Antioxidant Activity of the Carrot Films

Figure 5:
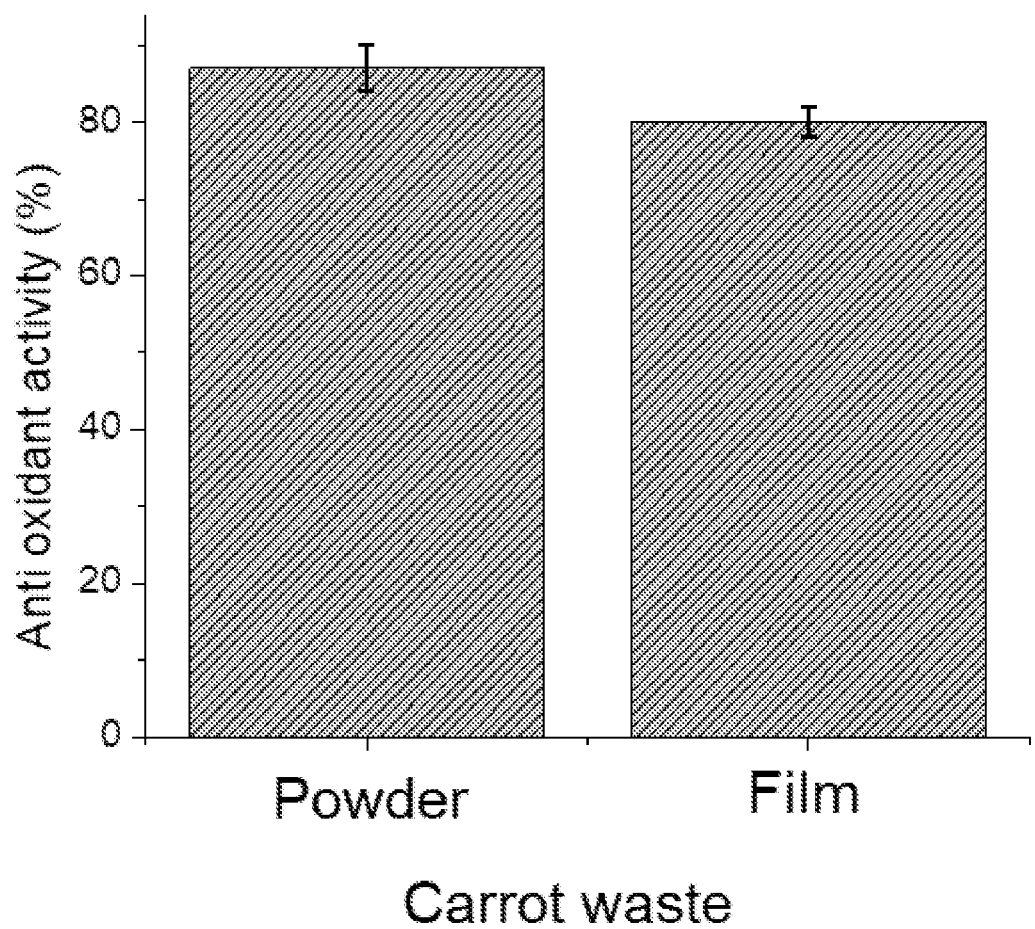
FIG. 5: shows, in form of histogram, the percentage of anti-oxidant activity detected for the film prepared in the following Example 6 and, by comparison, for the starting material used for preparing the film.

On the film prepared as described above in the Example 6 and in parallel, by comparison, on a sample of the starting material consisting of pomace waste carrot, the antioxidant activity was evaluated by the protocol described by Sharma O. P and Bhat, T. K. "DPPH antioxidant assay revisited", Food Chem. 2009, 113, 1202-1205. The results obtained in such tests, illustrated in FIG. 5, indicate a substantial maintenance of the antioxidant activity of the starting material in the film obtained with the present process too.

Example 14—Measurement of the Films Contact Angle

Figure 6:
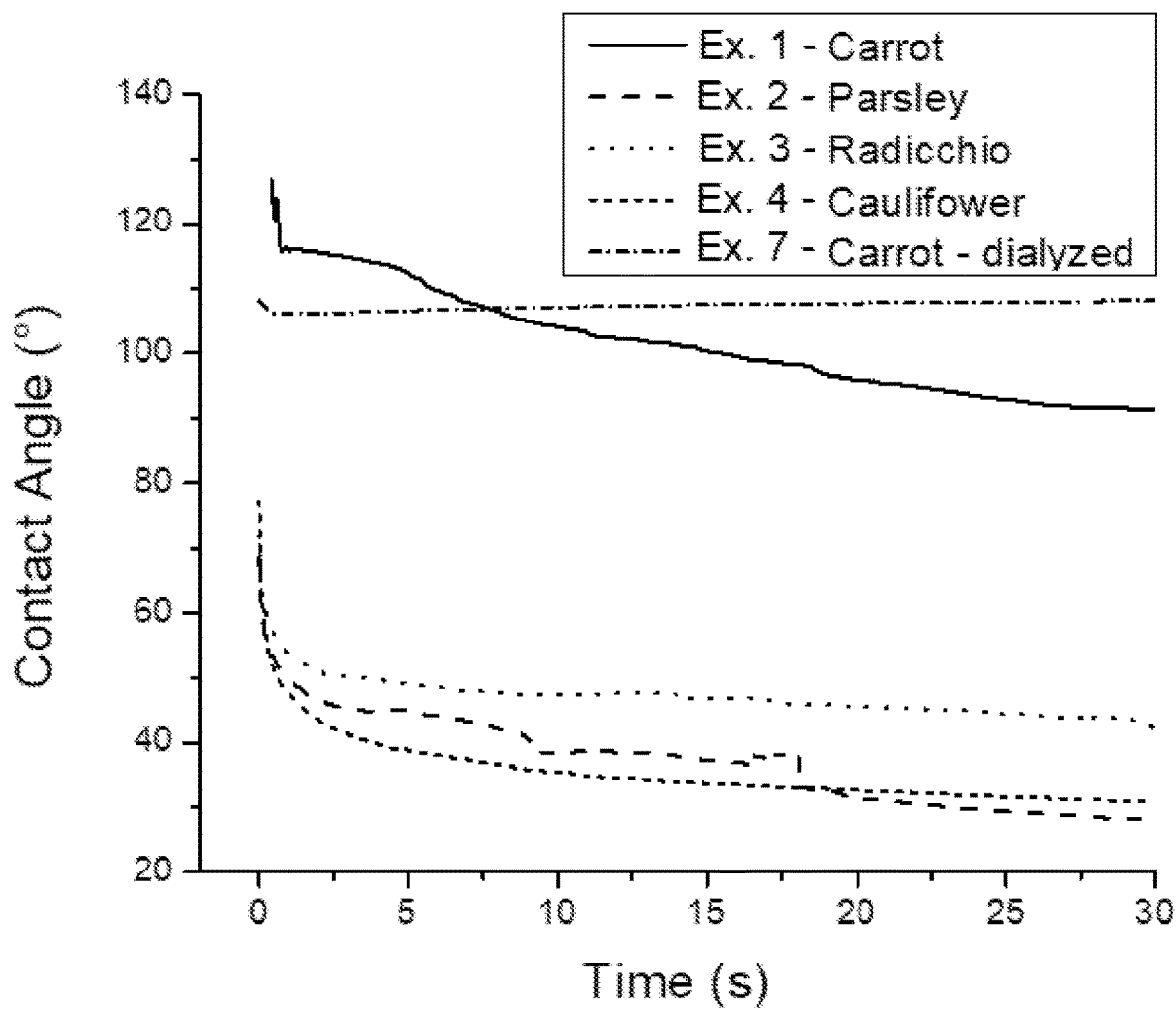
FIG. 6: shows the trend over time of the contact angle measured for the different films prepared as described in the following Examples 1-4 and 7.
Figure 7:
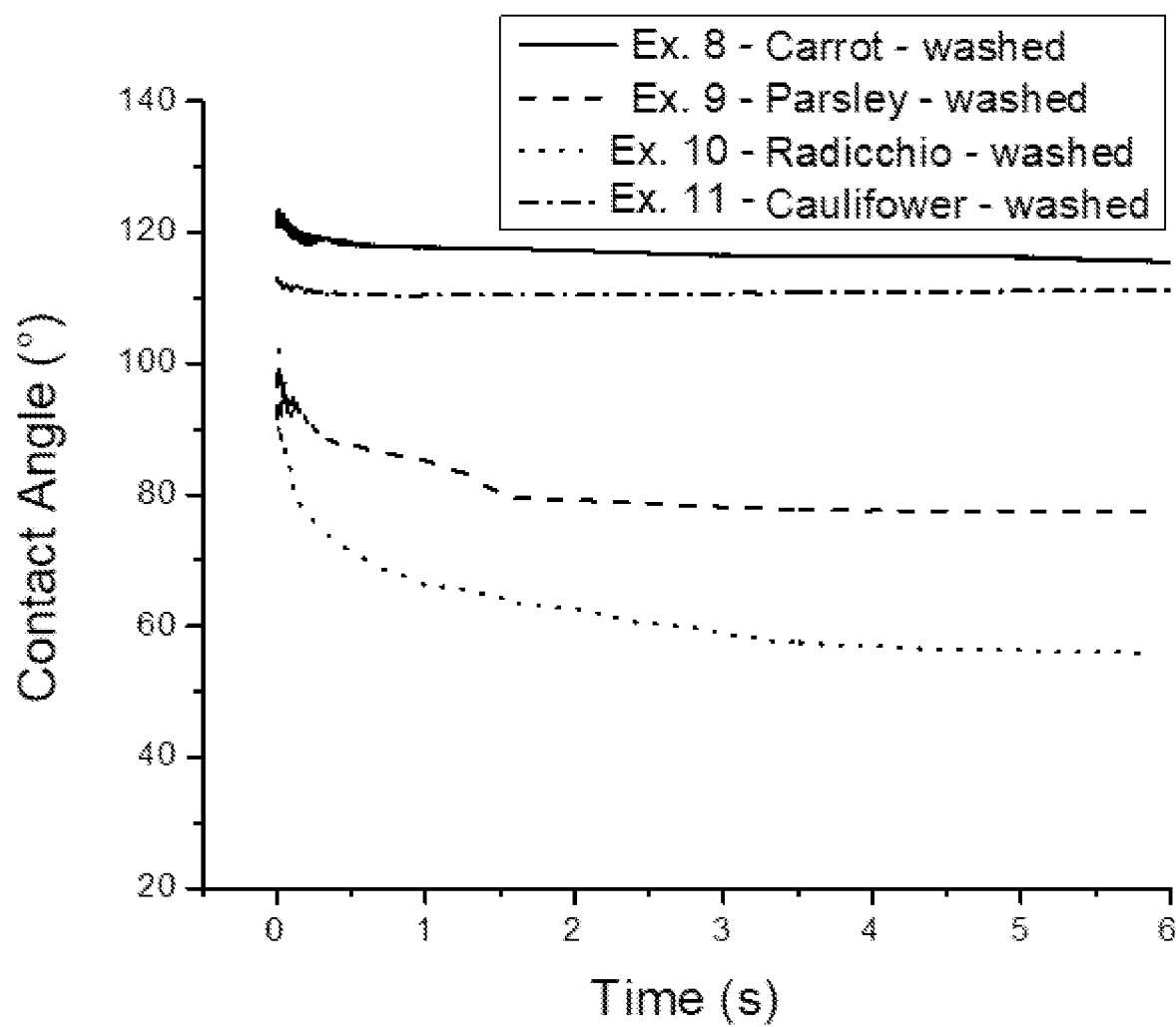
FIG. 7: shows the trend over time of the contact angle measured for the different films prepared as described in the following Examples 8-11.

The films prepared according to the procedure described above in the Examples 1-4 and 7-11 have been subjected to the characterization of the contact angle by means of measuring the angle between the liquid-solid and the liquid-air interface in a water drop poured from a syringe on the film surface, by using an instrument OCA-20 manufactured by DataPhysics. For the various films of the invention, the variation over time of the contact angles was measured, whose trend is showed in the graphs of FIGS. 6 and 7. By comparing these two figures, it can be seen how in general the contact angles increase for all the films going from a film obtained according to the Examples 1-4 to a same film that was also subjected to a washing post-treatment after casting according to the Examples 8-11. This increase is particularly relevant for the films obtained from cauliflower wastes, for which the washing transforms the film from hydrophilic into hydrophobic. In this regard, it is recalled that, by convention, the surfaces having contact angles with water greater than 90° are defined as hydrophobic, and the surfaces having contact angles with water smaller than 90° are hydrophilic.

The present invention was described herein with reference to a preferred embodiment. It is to be understood that other embodiments may exist which belong to the same inventive core, as defined by the scope of protection of the claims set forth in the following.

The invention claimed is:

1. A process for preparing a biodegradable plastic film starting from a vegetal waste material, said process comprising the following steps:
   i) dissolution at a temperature lower than 50° C. of said vegetal waste material in a form of a powder in an aqueous solution of hydrochloric acid, optionally added with acetic acid, wherein the total concentration of acid is equal to or lower than 5% by weight; and
   ii) transfer the solution obtained in step i), optionally filtered or centrifuged and/or subjected to dialysis against pure water, in a casting mold and evaporation of said aqueous solution, to yield said biodegradable plastic film.

2. The process according to claim 1, wherein said dissolution in step i) is completed in a time ranging between 1 and 18 hours.

3. The process according to claim 1, wherein said dissolution is carried out at a temperature ranging between 15° C. and 40° C.

4. The process according to claim 1, wherein said powder consists of particles with average size ranging between 10 and 500 micrometres.

5. The process according to claim 1, wherein said powder is dried before said dissolution.

6. The process according to claim 1, wherein said vegetal waste material is selected from the group consisting of wastes of carrot, radicchio, parsley stems and cauliflower stems.

7. The process according to claim 1, wherein said vegetal waste material is dissolved in said aqueous solution in step i) in a concentration ranging between 4 and 10% by weight with respect to the weight of the aqueous solution.

8. The process according to claim 1, wherein the biodegradable plastic film obtained in step ii) is subjected to washing with water.

* * * * *